United States Patent Office 3,490,997
Patented Jan. 20, 1970

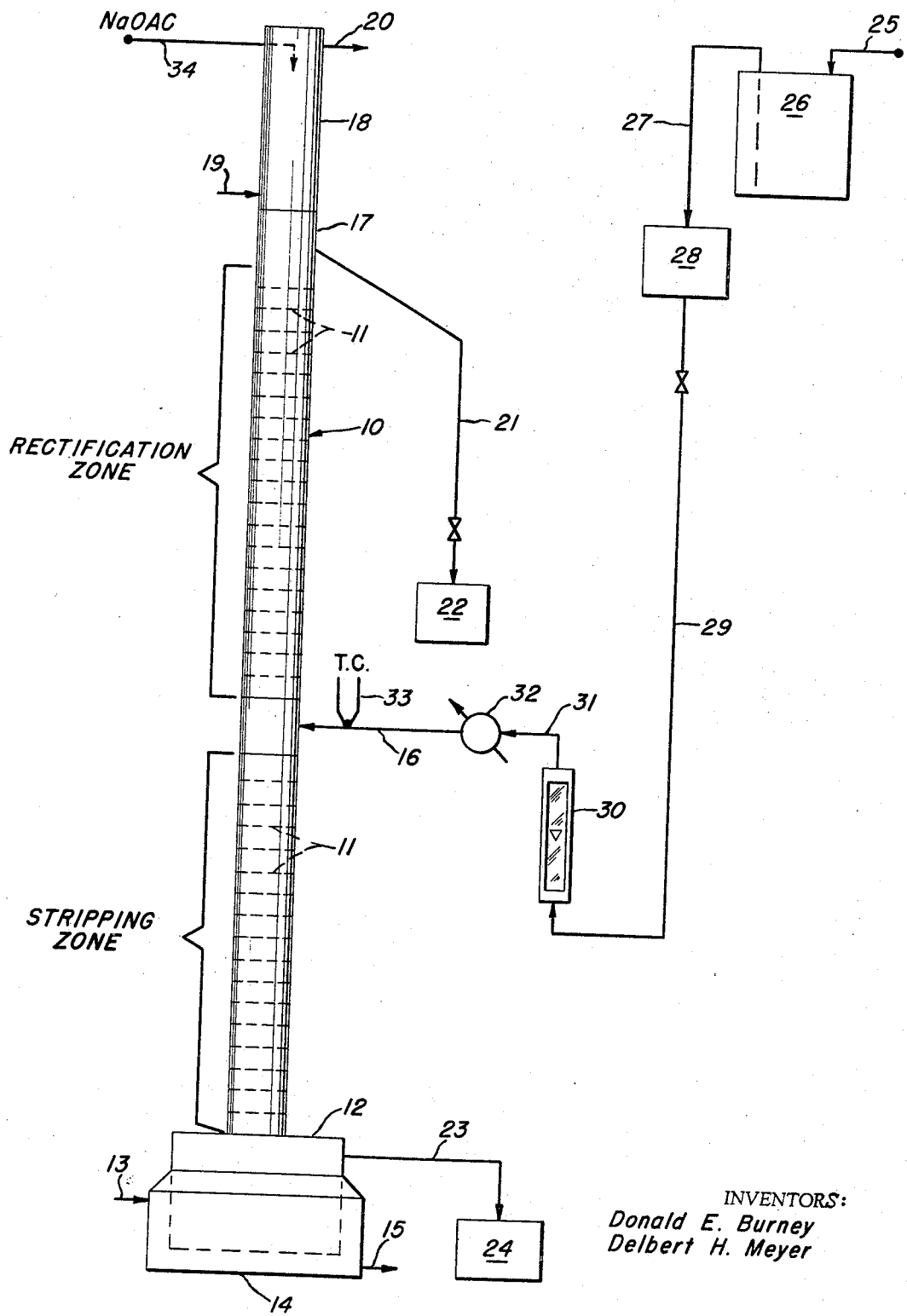

3,490,997
DEHYDRATION OF WET LOWER ALIPHATIC MONOCARBOXYLIC ACID BY DISTILLATION WITH ALKALI METAL IONS PRESENT
Donald E. Burney, Yokohama, Japan, and Delbert H. Meyer, Highland, Ind., assignors to Standard Oil Company, Chicago, Ill., a corporation of Indiana
Continuation-in-part of application Ser. No. 817,943, June 1, 1959. This application Jan. 7, 1965, Ser. No. 423,954
Int. Cl. B01d 3/34; C23f 14/00
U.S. Cl. 203—7                       11 Claims

ABSTRACT OF THE DISCLOSURE

Wet aliphatic monocarboxylic acid having from 2 to 4 carbon atoms and containing small amounts of halogens are concentrated by fractional distillation in a column fabricated from an iron-containing alloy in the presence of an alkali metal ion.

---

This application is a continuation-in-part of our copending application Ser. No. 817,943, filed June 1, 1959, and now abandoned.

This invention relates to the concentrating wet lower aliphatic monocarboxylic acids having 2 to 4 carbon atoms which wet aliphatic acid have from 70 to 95 weight percent of said $C_2$ to $C_4$ aliphatic acid, 30 to 5 weight percent water and small amounts, 10 to 90 p.p.m. on a weight base, of combined and ionic forms of halogens. More specifically this invention pertains to accomplishing said concentrating by continuous fractionation of said wet aliphatic acid as feed and especially a feed having as the halogens bromine and chlorine and more particularly chloride ions in the range of 2 to 10 p.p.m. on a weight base.

Several methods have been proposed for concentrating acetic acid diluted with water. Distillation is generally conceded as being not worthwhile for concentrating dilute aqueous acetic acid having less than about 30 weight percent acetic acid. The better of the heretofore proposed dilute acetic acid concentrating methods extract acetic acid with a solvent or mixtures of solvents therefore to obtain an extract containing in addition to the extracting solvent, substantially all of the acetic acid and about one-half of the water in the starting dilute aqueous acetic acid. The extract is distilled to remove water and the extracting solvent and recover an acetic acid concentrate of 94 to 95% acetic acid. Another method of concentrating dilute aqueous acetic acid involves adding thereto a material which under distillation conditions forms an azeotropic mixture with water, i.e. azeotropic distillation. This leaves behind an acetic acid concentrate generally containing as impurities only materials boiling higher than acetic acid. Also dilute aqueous acetic acids containing 30 weight percent acetic acid are distilled to obtain a fraction containing 15 weight percent acetic acid and a fraction containing 90% or higher acetic acid which requires further purification and/or concentrating.

As heretofore indicated the process of this invention is not concerned with and is not considered to be applicable to concentrating dilute aqueous acetic acids containing 5 to 30 or even 30 to 70% acetic acid by weight. Rather this invention is specifically directed to concentrating by continuous fractionation acetic acid feeds having 30 to 5 percent water, 70 to 95 percent acetic acid and 2 to 10 p.p.m. chloride ions, all on a weight basis, to obtain a concentrate having less water than the feed and particularly 97 to about 99 percent acetic acid and 3 to 1 percent water. Such feeds can be obtained from any process but are generally obtained from processes which use acetic acid as reaction solvent or reaction medium and it is desirable to reuse the acetic acid but in a more concentrated form than recovered from the process in which it is being used. The 5 to 30% water can enter as a by-product of the process where acetic acid is a solvent or medium for chemical reaction, e.g. in catalytic liquid phase air oxidations of hydrocarbons, or from wet reactants, e.g. dilute nitric acid in nitric acid oxidations also producing by-product water or by way of wet reactants alone, e.g. as hydrates of salts dissolved in more concentrated acetic acid. The process of this invention is not particularly suitable where the wet lower aliphatic acid contains high halide concentrations such as above 10 to 90 p.p.m. because such higher halide concentrations of 100 p.p.m. and above and especially where of the total halide there is more than about 10 p.p.m. chloride there cannot be prevented the hereinafter described deleterious effect of halide ion, particularly chloride ion, co-concentration. The process of this invention is applicable to concentrating wet propionic acid and wet butyric acid of the aforementioned 5 to 30 percent water and 2 to 10 p.p.m. chloride ion contents.

Usually the wet lower $C_2$ to $C_4$ aliphatic acids having 5 to 30 weight percent water and 2 to 10 p.p.m. chloride ion with the 70 to 95 weight percent $C_2$ to $C_4$ aliphatic acid are obtained where acetic acid is used as solvent or reaction medium at temperatures above 115 to 118° C. and acetic acid vapors are scrubbed with process water before exhaust gases are vented to the atmosphere. The aqueous scrubber liquors are added to the used solvent and this mixture is to be concentrated by removal of water. Well water can contain 1 to 6 p.p.m. chloride ion and is generally the contribution by way of gas scrubbers of the chloride ions present in the wet aliphatic acids to be concentrated.

In the understanding of the present invention azeotropic distillation, simple distillation and batch fractionation are not to be confused with continuous fractionation. In continuous fractionation the concentration of the feed is accomplished by reboiling, stripping and rectification zones. Heat is supplied to the reboiling zone to maintain boiling liquids therein. Vapors from the reboiling zone provide heat to the stripping zone and vapors from the stripping zone provide heat to the rectifying zone. The wet feed is introduced between the stripping and rectifying zones.

The accompanying drawings is a schematic illustration of a fractionation system and also illustrates one embodiment of the present invention. In the drawing there is shown a fractionation system comprising fractionating column 10 fitted with trays 11 whose weirs and downcomer tubes are not shown and a bottom reboiler zone (or still pot) 12 to which heat is supplied as, for example, by steam conduit 13 to jacket 14 and condensate is removed therefrom by conduit 15. Fractionating column 10 comprises a stripping zone identified by the legend bracket and is below entry of wet aliphatic acid charging conduit 16 and above bottom reboiler zone 12 and a rectification zone identified by legend bracket and above entry of wet aliphatic charging conduit 16 and below ariable take off vapor splitting head 17. Above vapor plitting head 17 is condenser 18 cooled by water entering conduit 19 and leaving by conduit 20. Continuous eflux is provided. Water removed by fractionation is withdrawn through valved conduit 21 to receiver 22. Dehydrated aliphatic acid is shown as being withdrawn from bottom reboiler 12 through conduit 23 to dehydrated acid receiver 24. A gravity flow system is shown for feeding wet aliphatic acid containing bromide and/or chloride ions to fractionating column 10. The wet aliphatic acid is obtained from gathering conduit 25 and is held in feed reservoir 26 from which the wet aliphatic acid is withdrawn by gravity flow by conduit 27 to a constant head feed tank 28. Wet aliphatic acid then flows through valved transfer conduit 29 through flow meter 30 and conduit 31 to pre-heater 32 and thence to charging conduit 16 containing thermocouple 33. For operating it a hereinafter described embodiment where a source of alkali metal is employed to aid in further reducing concentration of chloride ions in the stripping zone conduit 34 is shown for adding a source of alkali metal to the top of condenser 20. The operation of the entire system illustrated will be understood from the detailed descriptions hereinafter appearing.

Concentrating of wet $C_2$ to $C_4$ aliphatic monocarboxylic acids having 5 to 30 weight percent water, 95 to 70 weight percent $C_2$ to $C_4$ aliphatic acid and 2 to 10 p.p.m. chloride ion by continuous fractionation has not been commercially acceptable because of corrosion problems encountered in stainless steel fractionating towers. Copper apparatus underwent corrosion too and would introduce copper poisoning where the recovered acetic acid for example was subsequently reused as solvent in a copper sensitive reaction. Silver, ceramic and glass apparatus were not suitable from the basis of cost, strength or thermal shock or physical shock considerations. The cause of the corrosive conditions found in concentration by continuous fractionation was thought to be contributed by boiling acetic acid of 95 to 98 and higher weight percent. We have found that corrosion resulting from chloride ion concentrating in the stripping zone to chloride ion concentrations above 100 p.p.m. up to 300 p.p.m. and higher from the 2 to 10 p.p.m. in the feed was far more drastic than the corrosion caused by boiling 95 to 98 weight percent acetic acid. For example, the chloride ion concentrating from 3 p.p.m. in the feed to 120 p.p.m. in the boiling liquid in the stripping zone caused a corrosion rate of 316 type stainless steel of 239 mils per year. In contrast the same boiling acetic acid concentration at the same point in the stripping zone but having substantially no chloride ion caused a corrosion rate of 316 type stainless steel of only 24 mils per year which is only about 10% of that caused by the chloride ion buildup or concentrating to 120 p.p.m. in the stripping zone.

To illustrate the corrosion problems encountered in the continuous fractionation of wet acetic acid in the presence of chloride ions to a 99% by weight acetic acid product, a wet acetic acid containing about 20% by weight water, 31 p.p.m. total bromine, 9 of which are ionic bromine, and 3 p.p.m. of chloride was use as a feed. The wet acid was fed to the 15th tray of a 40 tray distillation column operated continuously under fractionating conditions. This dehydration apparatus comprised a reboiler and a 40 tray column. The column is divided into a stripping zone comprising the first 15 trays in the column above the reboiler zone and a rectification zone comprising the 16th to 40th trays which, of course, includes the reflux zone. A condenser is superimposed on the reflux zone. Coupons of 316 stainless steel were placed in both the liquid and vapor of the reboiler zone and on trays 5, 10, 15 and 20 to determine the amount of corrosion occurring in the liquid and vapor phase. The distillation system was operated continuously taking off as a liquid product from the bottoms or reboiler zone a 99% by weight acetic acid. An aqueous product lean in acetic acid was taken from the top of the column. After 100 hours of operation, the distillation equipment was shut down and the stainless steel coupons were weighed and their thickness measured to determine the weight loss as well as reduction in thickness by the corrosion. Chloride and bromide ion concentration during operation was determined. The corrosion rates and the halide concentrations are shown in Table I below.

TABLE I.—CORROSION RATE MILS PER YEAR OF 316 STAINLESS STEEL

| Fractionation zone | Coupon position | | Halide concentrations, p.p.m. | |
| --- | --- | --- | --- | --- |
|  | Liquid phase | Vapor phase | Bromide | Chloride |
| Tray 20 |  |  | N.D. | N.D. |
| Tray 15 | 116 | 13 | 5 | 40 |
| Tray 10 | 239 | 153 | 14 | 120 |
| Tray 5 | 44 | 39 | 4 | 8 |
| Reboiler | N.D. | N.D. |  |  |

N.D.—None detected.

From the foregoing liquid phase corrosion rate at tray 10 it is readily seen that a tray 0.25 inch thick would have at a maximum a useful life of about 10 months before it was completely consumed.

An improved method for continuously fractionating wet lower $C_2$ to $C_4$ aliphatic monocarboxylic acid feed containing small amounts of halide ions, especially wet acetic acid, containing 95 to 70 weight percent acetic acid, 5 to 30 weight percent water and chloride ions as well as other halide ions, to a concentrate product containing less water than the feed has been discovered. By this method the disclosed drastic corrosion of stainless steel is reduced to a commercially acceptable rate. Thus for the first time concentration by continuous fractionation of said feeds can be conducted in stainless steel fractionating towers.

It has now been discovered that wet lower $C_2$ to $C_4$ aliphatic monocarboxylic acids having from 70 to 95% $C_2$ to $C_4$ aliphatic acid, from 5 to 30% by weight water and from 2 to 90 p.p.m. total of halide ions, especially 2 to 10 p.p.m. chloride ions, can be concentrated by continuous fractionation to an aliphatic acid concentrate having less water than the feed but not less than about 1.6 to 2 weight percent water and not at the same time concentrate chloride ions in the stripping zone of the continuous fractionation by the introduction of alkali metal ions into the dehydration system, either by introducing the alkali metal ions with the wet aliphtic acid feed or by adding alkali metal ions in or above the rectification zone, the concentration of chloride ions can be substantially lowered and a bottoms product of up to 98% monocarboxylic acid suitable for reuse can be taken while still further reducing the rate of corrosion. The amount of alkali metal ion introduced to obtain the foregoing effects is within the range of 1 to 10 atoms of alkali metal per halogen ion present in the wet aliphatic monocarboxylic acid feed. Desirably, there is added 2 to 7 and preferably 3 to 5 atoms of alkali metal per halogen ion in the wet acid feed. Sodium and potassium ions are desirably added with the addition of sodium ions preferred. The alkali metal ions can be added as the carbonates, bicarbonates, the hydroxides or in a form soluble in the aliphatic monocarboxylic acid such as the alkali metal salt of the acid being concentrated. It is preferred to add sodium ions either as sodium hydroxide or the salt of the acid being concentrated, for example, sodium acetate when acetic acid is being concentrated.

By the use of an alkali metal ion in the dehydration system the built up halide ions, mainly chloride, in the liquids in the system such as on the trays or in the packed column can be reduced.

For example, by employing an alkali metal ion in the continuous dehydration system, the corrosion can be reduced to 15 to 20 mils per year and the corrosion in the reboiler reduced to substantially no corrosion at all.

The process of this invention is illustrated by the following example.

EXAMPLE

The concentration by continuous fractionation before described was repeated for 100 hours. During this concentration a solution of sodium hydroxide in acetic acid was added to the top of the rectification zone at the rate of 5 atoms of sodium per atom of total halide (chloride plus bromide) in the feed. The amount of corrosion occurring on the new coupons placed on trays 5, 10, 15 and 20 and in the reboiler in both the liquid and vapor phases, together with the bromide and chloride concentrations, are shown in Table II. The dehydrated acetic acid product contains less than 10 p.p.m. iron. Acetic acid of 97 to 98.4% by weight is removed as bottoms product.

TABLE II.—CORROSION RATE MILS PER YEAR OF 316 STAINLESS STEEL

| Fractionation zone | Coupon position | | Halide concentrations p.p.m. by weight | |
|---|---|---|---|---|
|  | Liquid phase | Vapor phase | Bromide | Chloride |
| Tray 20 | 10 | 5 | N.D. | N.D. |
| Tray 15 | 15 | 5 | 2–5 | 0–.4 |
| Tray 10 | 24 | 10 | 5 | 0–2 |
| Tray 5 | 20 | 5 | 3–5 | *0–6 |
| Reboiler | 0 | 0 | 4–6 | 4–6 |

*Chloride concentration 6 p.p.m. for the first 2 hours and 0–.7 p.p.m. thereafter.
N.D.—None detected.

The process of the example is repeated except sodium acetate is added to provide the 5 atoms of sodium per atom of total halide in the feed. By this process the corrosion rate in the liquid phase is maintained below 25 p.p.m. and chloride concentration below 5 p.p.m.

The process of the example is repeated except potassium hydroxide in an amount to provide 5 atoms of potassium per atom halide is employed in place of sodium hydroxide. By this process substantially the same low corrosion rates and chloric concentrations may be obtained.

To illustrate that the hereinbefore described and illustrated problems with respect to continuous fractionation concentrating of lower $C_2$ to $C_4$ aliphatic monocarboxylic acids containing the amount of water and a halogen disclosed with respect to this invention are not limited to the source of the wet acid to be concentrated, a wet acetic acid mixture containing the following composition was fed continuously into a 40 tray fractional tower hereinbefore described with fresh 316 stainleless steel coupons in the locations indicated.

Acetic acid _____ percent by weight__ 77
Water _____ do____ 23
Chloride ion _____ p.p.m. by weight__ 10

To illustrate again the method of this invention the above 77% by weight acetic acid feed containing 10 p.p.m. chloride ion and 23% by weight water is concentrated employing 7 atoms of sodium (added as the carbonate) per atom of chlorine. By this process the corrosion rates may be reduced to about 25–35 mils per year and the chloride ion concentration maintained below about 5 to 10 p.p.m. in the liquid phases in the column when taking as a product 97.5 to 97.7% by weight acetic acid concentrate.

What is claimed is:
1. In the continuous dehydration of a mixture containing a lower aliphatic monocarboxylic acid, 5 to 30% water by weight and chloride ions in the range of from 2 to 10 p.p.m. and a total halide ion content of not more than 90 p.p.m. by fractional distillation in fractionation apparatus of which the components of the fractionating column are fabricated from an iron-containing alloy to obtain said lower aliphatic monocarboxylic acid as a product suitable for reuse, wherein said fractional distillation is conducted in a fractionation system comprising a rectification zone, a stripping zone and a bottom reboiler zone and wherein said mixture is fed to the fractionation system between said rectification zone and said stripping zone, and water is removed from above said rectification zone, the improvements comprising: continuously fractionally distilling said mixture in the presence of 1 to 10 atoms of alkali metal per halide ion present in said feed mixture and withdrawing from below said stripping zone a lower aliphatic monocarboxylic acid product not exceeding about 98%.

2. In the continuous dehydration of a mixture containing acetic acid, 5 to 30% water by weight and chloride ion in the range of from 2 to 10 p.p.m. by fractional distillation in fractionation apparatus of which the components of the fractionating column are fabricated from an iron-containing alloy to obtain acetic acid as a product suitable for reuse, wherein said fractional distillation is conducted in a fractionation system comprising a rectification zone, a stripping zone and a bottom reboiler zone and wherein said mixture is fed to the fractionation system between said rectification zone and said stripping zone, and water is removed from above the rectification zone, the improvements comprising: continuously fractionally distilling said mixture in the presence of 1 to 10 atoms of alkali metal per atom of halide ion present in said feed mixture and withdrawing from below said stripping zone an acetic acid product not exceeding about 98%.

3. The process of claim 2 wherein the alkali metal atoms added are in the range of 2 to 5 atoms per atom of halide ion in the feed.

4. The process of claim 2 wherein the alkali metal atoms are added in an amount of from 2 to 5 atoms per atom of halide ion in the feed and are added to the rectification zone.

5. The process of claim 2 wherein the alkali metal atoms are sodium and are added to the feed in an amount of from 2 to 5 atoms per atom of halide ion in the feed.

6. In the continuous dehydration of a mixture containing acetic acid, 5 to 30% water by weight and 2 to 50 p.p.m. halide ion comprising chloride and bromide ions and the chloride ions comprise 2 to 10 p.p.m. of said wet acetic acid, by fractional distillation in fractionation apparatus of which the component parts of the fractionating column are fabricated from an iron-containing alloy to obtain acetic acid as a product suitable for reuse wherein said fractional distillation is conducted in a fractionation system comprising a rectification zone, a stripping zone and a bottom reboiler zone and wherein said mixture is fed to the fractionation system between said rectification zone and said stripping zone, and water is removed from above said rectification zone, the improvements comprising: continuously fractionally distilling said mixture in the presence of from 2 to 5 atoms of sodium per atom of halide ion in said feed and withdrawing from below said stripping zone acetic acid not exceeding about 98%.

7. The process of claim 6 wherein the sodium atoms are added to the rectification zone.

8. The process of claim 6 wherein the sodium atoms are added to the feed.

9. The process of claim 6 wherein the sodium atoms are added as sodium hydroxide.

10. The process of claim 6 wherein the sodium atoms are added as sodium acetate.

11. The process of claim 6 wherein the acetic acid product is withdrawn from the vapors in contact with the liquids in the reboiler zone.

References Cited

UNITED STATES PATENTS

| | | | |
|---|---|---|---|
| 2,114,825 | 4/1938 | Wentworth | 260—541 |
| 2,710,879 | 6/1955 | Snyder | 260—541 |
| 3,084,109 | 4/1963 | Ure | 203—33 |

OTHER REFERENCES

Plar: "Wood Distillation," Chapman and Hall, Ltd. (1925), pp. 310 and 316 to 321.

WILBUR L. BASCOMB, JR., Primary Examiner

U.S. Cl. X.R.

203—33, 37, 38, 53, 86; 260—541